INVENTORS.
KARL WILHELM STEINBUCH
HERMANN ENDRES
BY Philip M. Bolton
ATTORNEY

INVENTORS
KARL WILHELM STEINBUCH
AND HERMANN ENDRES.
BY R. F. Morris
ATTORNEY

AUTOMATIC CHARACTER RECOGNITION METHOD

Filed July 10, 1958

10 Sheets-Sheet 3

INVENTORS.
KARL WILHELM STEINBUCH
BY HERMANN ENDRES
Philip M. Bolton
ATTORNEY

INVENTORS
KARL WILHELM STEINBUCH
AND HERMANN ENDRES.

BY R P Morris

ATTORNEY

INVENTORS
KARL WILHELM STEINBUCH
AND HERMANN ENDRES.
BY R. P. Morris
ATTORNEY

INVENTORS
KARL WILHELM STEINBUCH
AND HERMANN ENDRES.
BY R. P. Morris
ATTORNEY

AUTOMATIC CHARACTER RECOGNITION METHOD

Filed July 10, 1958

10 Sheets-Sheet 7

INVENTORS
KARL WILHELM STEINBUCH
AND HERMANN ENDRES

BY R P Morris

ATTORNEY

INVENTORS
KARL WILHELM STEINBUCH
AND HERMANN ENDRES.
BY R P Morris
ATTORNEY

INVENTORS
KARL WILHELM STEINBUCH
AND HERMANN ENDRES.
BY R. P. Morris
ATTORNEY

INVENTORS.
KARL WILHELM STEINBUCH
HERMANN ENDRES
BY Philip M. Bolton
ATTORNEY

United States Patent Office 3,069,079

Patented Dec. 18, 1962

3,069,079

AUTOMATIC CHARACTER RECOGNITION METHOD

Karl Wilhelm Steinbuch, Fellbach, Wurttemberg, and Hermann Endres, Stuttgart-Muhlhausen, Germany, assignors to International Standard Electric Corporation, New York, N.Y., a corporation of Delaware Filed July 10, 1958, Ser. No. 747,689

Claims priority, application Germany July 17, 1957

19 Claims. (Cl. 235—61.11)

The present invention relates to the identification or characters, especially of printed characters.

Various methods and arrangements for the identification of characters have already become known. In some of these methods the characters are scanned along certain lines and the transitions from the character field to the character or vice versa are determined for the evaluation purpose. In other methods the scanning field is divided into a scanning raster and each of the raster elements is examined with respect to blackening by a portion of the characters. With all of the conventional methods the scanning operation may be accomplished either optically, magnetically, galvanically or electro-statically, quite depending on how the characters are arranged on the character supporting means. In order that it may be possible for the scanning results, which finally exist as electrical signals, to be assigned to the characters to be identified, it is necessary in most cases to provide a storage device, in which the incoming signals are at first stored and from there applied to the evaluating arrangement.

Counting chains or shift registers of the conventional type are used, for instance, the signals of all scanning tracks being stored in one or more chains of storage devices which are independent of one another. Counting chains are required in such cases where the number of black points per scanning track is utilized for identifying the characters, whereas shift registers comprising several chains of storage devices are appropriate when evaluating the characters according to the position within the raster pattern. Thus the storage device only serves the subsequent evaluation purpose, but has, itself, no influence upon the evaluation.

In contrast thereto the invention is based on the problem of providing a storage device which has certain advantages with respect to the conventional or already suggested indentification methods and still provides the possibility of being directly utilized for the evaluation.

Subject matter of the present invention concerns the automatic identification of characters, in particular printed characters, which are scanned either along certain lines, or fully parallel in an optical, magnetical, galvanical or electro-statical manner. According to the invention the scanning signals are stored in a two-dimensional shift register, whose individual storage cells are assigned in the same spacial arrangement to the raster areas of the scanning field, permitting a displacement of the stored information in all four directions for a further evaluation.

The shift register may consist of flip-flop stages, ring-cores having a rectangular hysteresis loop, or of any other bistable elements or arrangements.

The reading-in of the scanning signals into a two-dimensional shift register bears the advantage that the characters are electrically simulated as a whole, i.e. in a plane-shaped manner, thus permitting corresponding position corrections to be carried out, which is of use in most of the evaluating methods.

The invention, however, still bears the added advantage that the storing into a two-dimensional type of shift register offers new possibilities to the character identification. Thus it is possible, for instance, to provide one coincidence network for each character to be identified whose inputs are combinations of outputs of all storage cells representing combinations of "black" and "white" criteria, depending on the particular character.

With respect to the following description it will be understood that the terms "black" and "white" are not exclusively meant in the optical sense, but that they may also mean e.g. "current" or "no-current" in a corresponding electrical scanning operation. After the reading-in of the scanning signals, therefore, the character will result from the coincidence conditions complied with. Since, due to vertical or lateral displacements, or due to a faulty print, there will not always be a complete coincidence within the scanning field, the coincidence arrangement is appropriately made in such a way that an incomplete coincidence of the read character with an ideal character will result in a positive statement. This may be carried out in the most simple way by performing the coincidence check simultaneously or successively with differently severe coincidence conditions.

Displacements of the character within the scanning field may be easily corrected with the aid of the two-dimensional type of shift register, in that the stored character is shifted within the register until the read character in the plane-shaped storage device will come to lie as exactly as possible on the connected coincidence arrangement. In this case the coincidence condition may be rather severe, and the reduced or moderated coincidence requirements will only serve the consideration of the faulty print, or the like.

The displacement of the characters within the storage device or shift register may be effected in a spiral-shaped or meander-shaped manner, in order to reach the respective coincidence arrangement from every appearing output position of the characters on the plane-shaped storage device. The expansion of the spiral to be passed through is adapted to the maximum extent of character displacements which are likely to appear.

In order to determine a faulty print together with the character displacement, it is appropriate that the spiral is passed through several times, that is, at first from the inside towards the outside and thereupon from the outside towards the inside, etc. and to reduce point the coincidence requirements at each reversing point, beginning with the most severe requirement, until finally a character statement is effected.

If, for instance, for reasons of saving time, the spiral is only passed through once, then it is possible to provide means for reading every position of the characters simultaneously with several coincidence requirements. The different statements will then be stored and the best coincidence will be determined subsequently to the passing through of the spiral and assigned to the corresponding character.

However, the storing of the characters also permits a fundamentally different method of character indentification to be carried out. In this method the characters are shifted in the plane-shaped storage device according to a definite law in order to permit the determination of the character contours. The statements regarding the contours are then assigned to the characters by means of a special coincidence arrangement.

For the carrying out of this method of the invention, the shift register is doubled and is provided with an additional middle row of storages cells, which is used for determining the character contours in the course of the different shifting stages. These are determined in such a way by a coincidence arrangement in accodance with the statements of the middle row of storage cells that the contours of the character will travel a predetermined path over the middle row of storage cells. For example, it is possible to evaluate at first the right-hand edge and thereafter the left-hand edge of the character, in that the character is stored into the lower part of the plane-shaped storage device, and is then shifted into the upper half in such a way that the right-hand edge will pass the middle one of the storage cells of the middle row of storage cells. Upon shifting the character back into the lower half of the storage device the left-hand edge will then be shifted through the middle storage cell. From the order of succession, the number and direction of the shifting steps along the rows of storage cells, the character may then be determined with the aid of a coresponding coincidence and counting arrangement.

The above-mentioned and other features and objects of the invention and the manner of attaining them will become more apparent and the invention itself will be best understood by reference to the following description of two embodiments of the invention taken in conjunction with the acompanying drawings, wherein.

Figure 1:
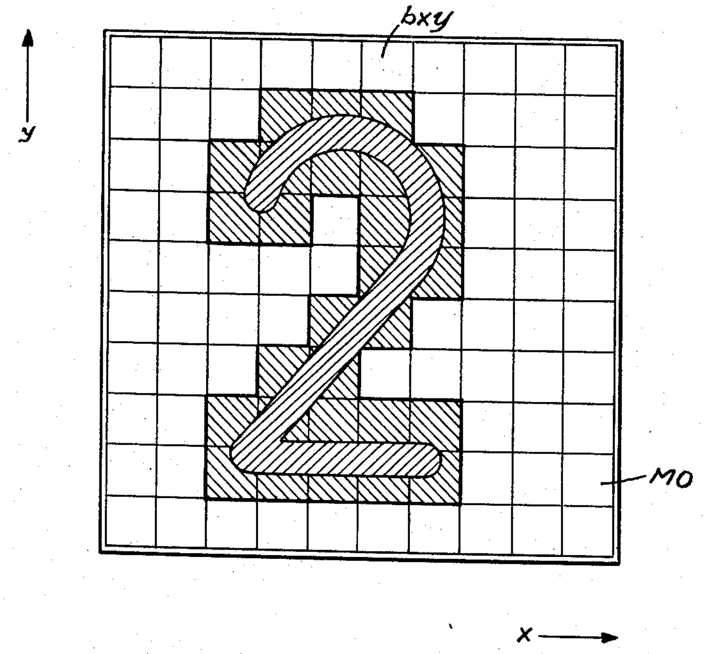
FIG. 1 shows the numeral 2 within a black and white raster pattern.
Figure 9C:
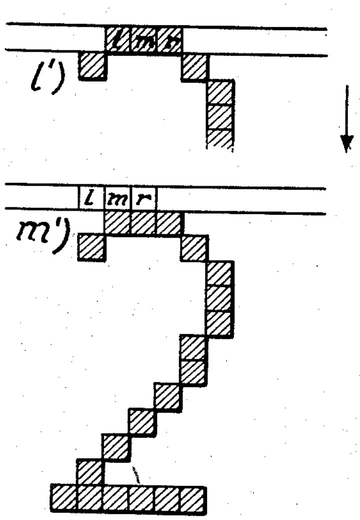
Figure 2:
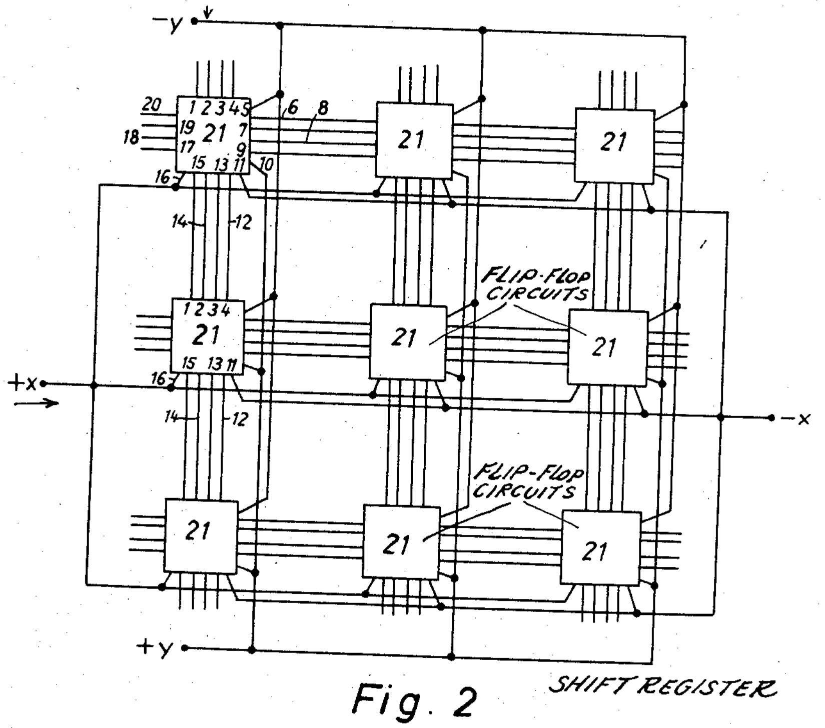
FIG. 2 shows a block diagram of a two-dimensional shift register.
Figure 3:
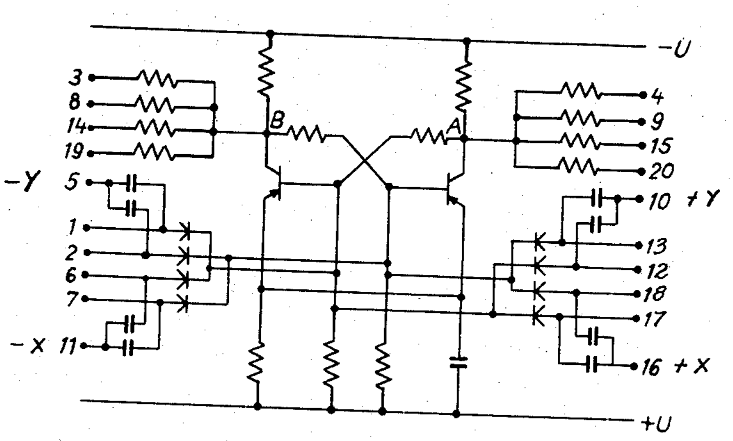
Figures 3A, 3B:
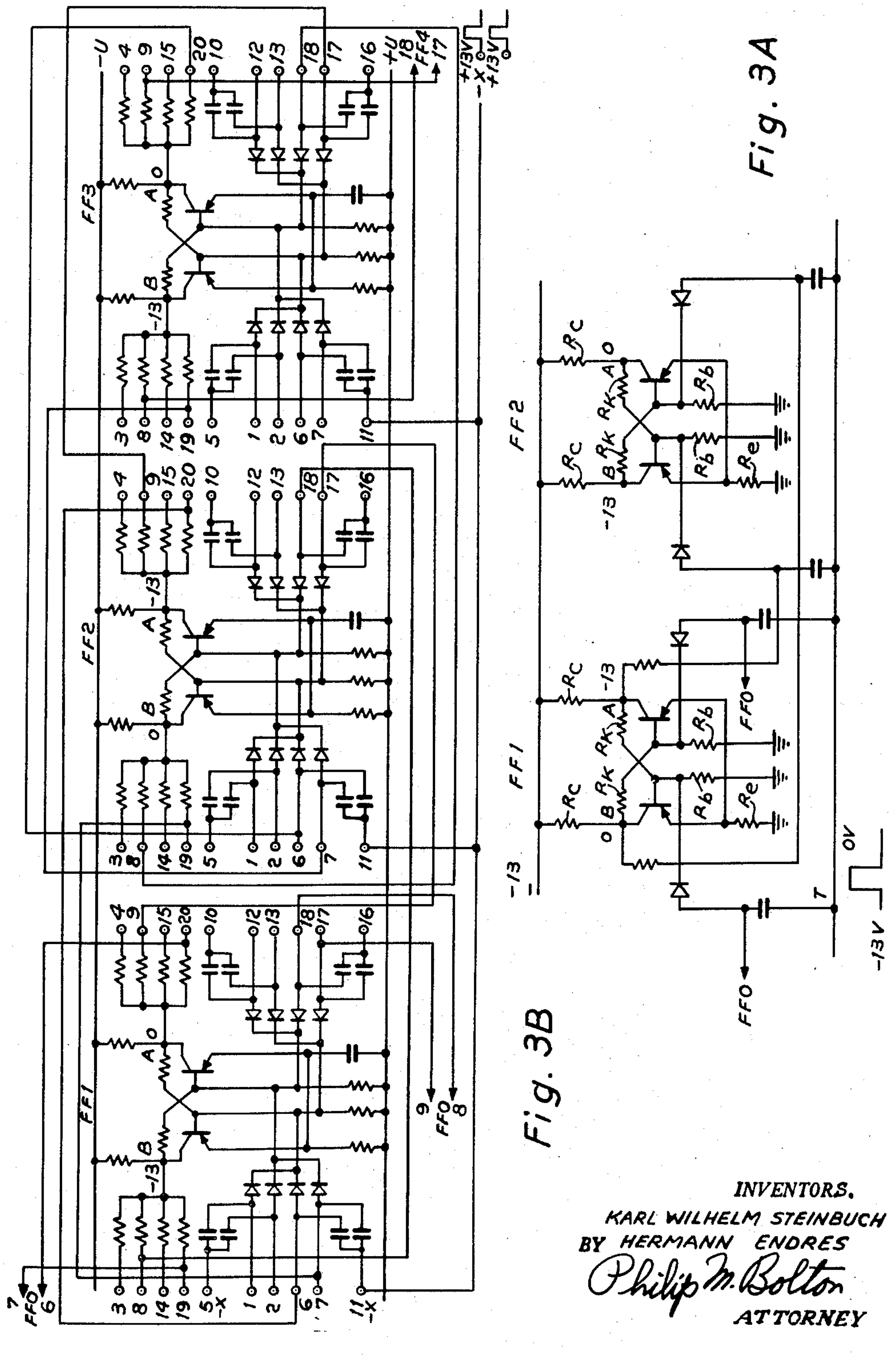
Figure 4:
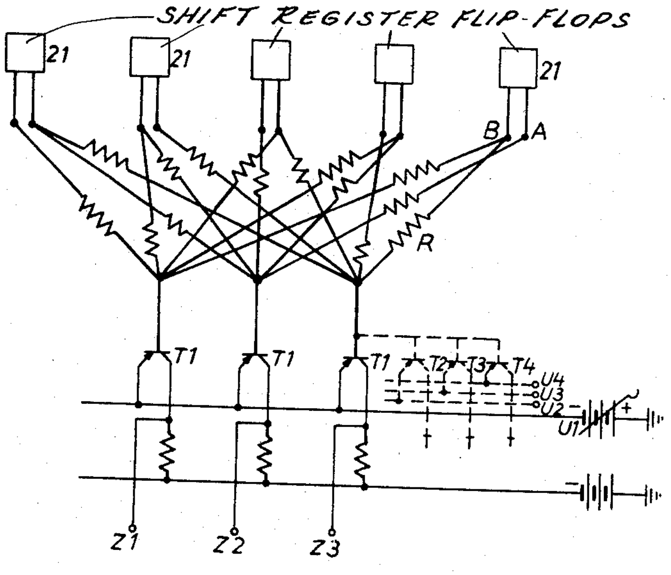
Figure 6:
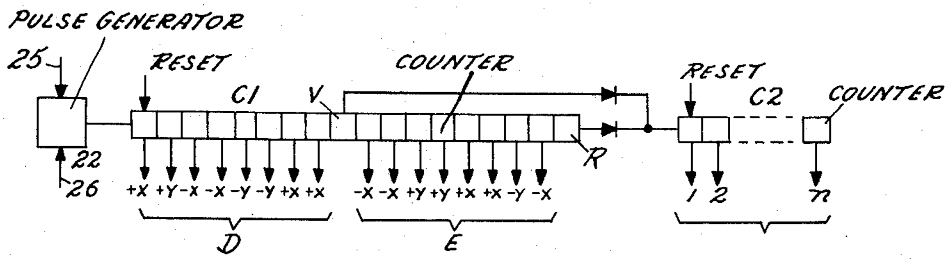
Figure 5:
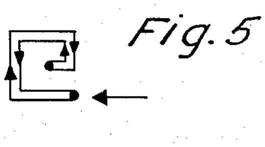
Figure 7:
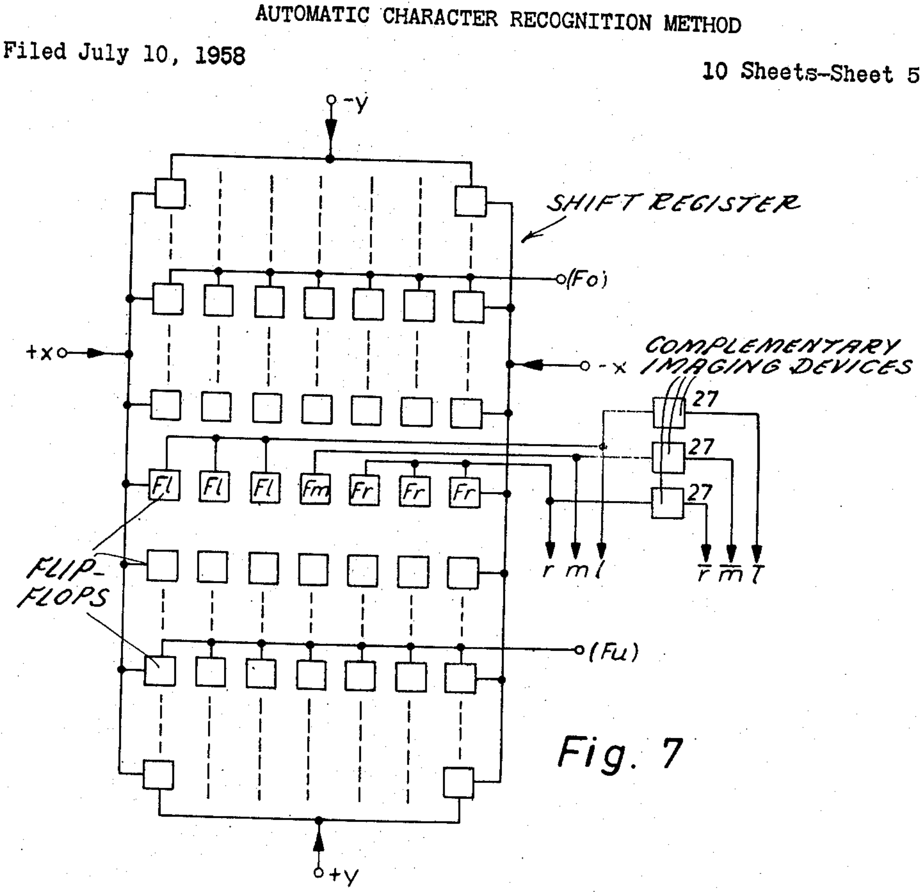
Figure 8:
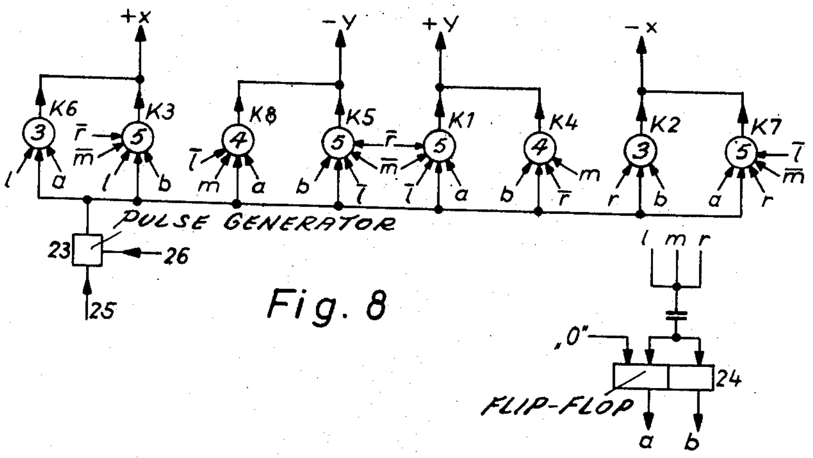
Figure 9:
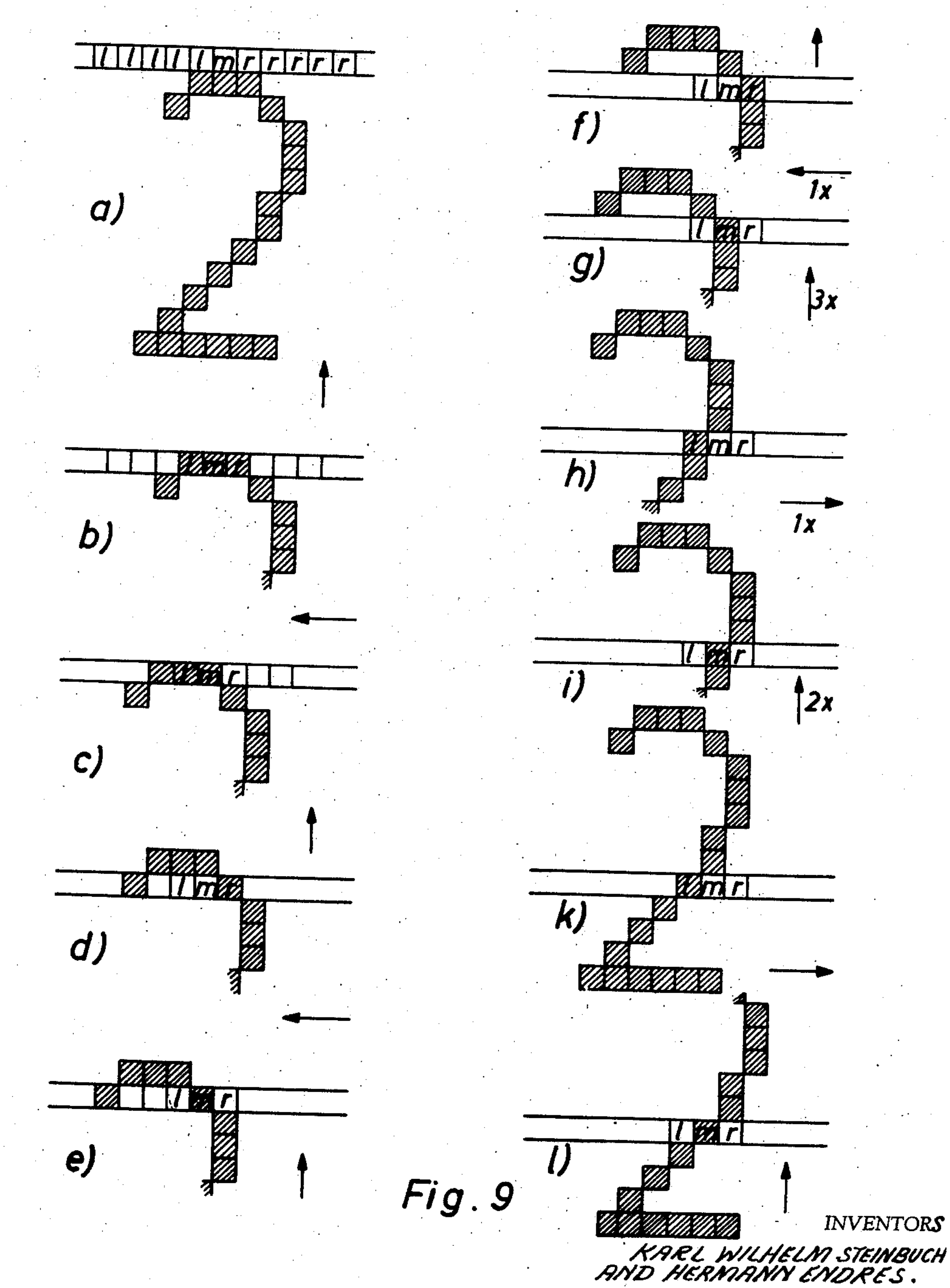
Figure 9A:
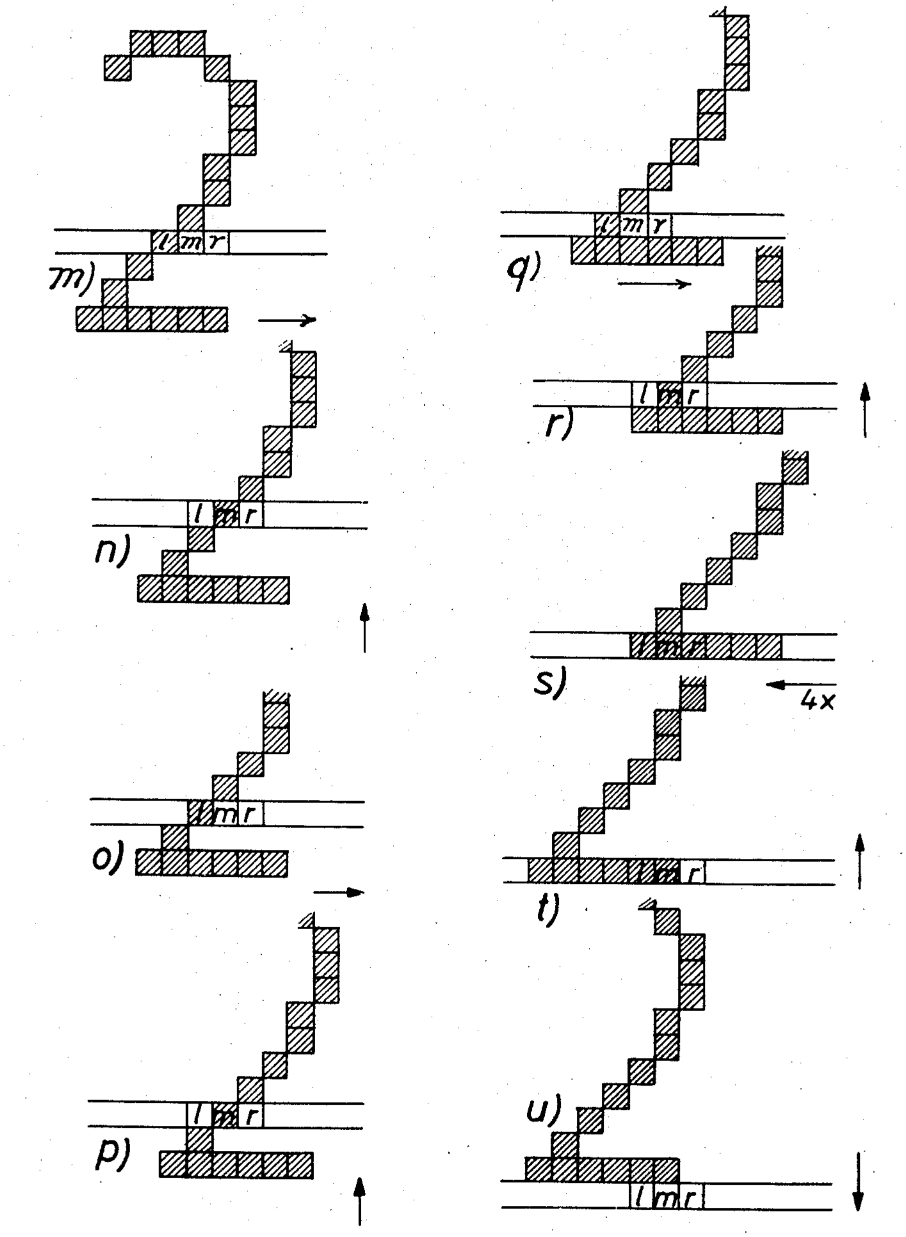
Figure 9B:
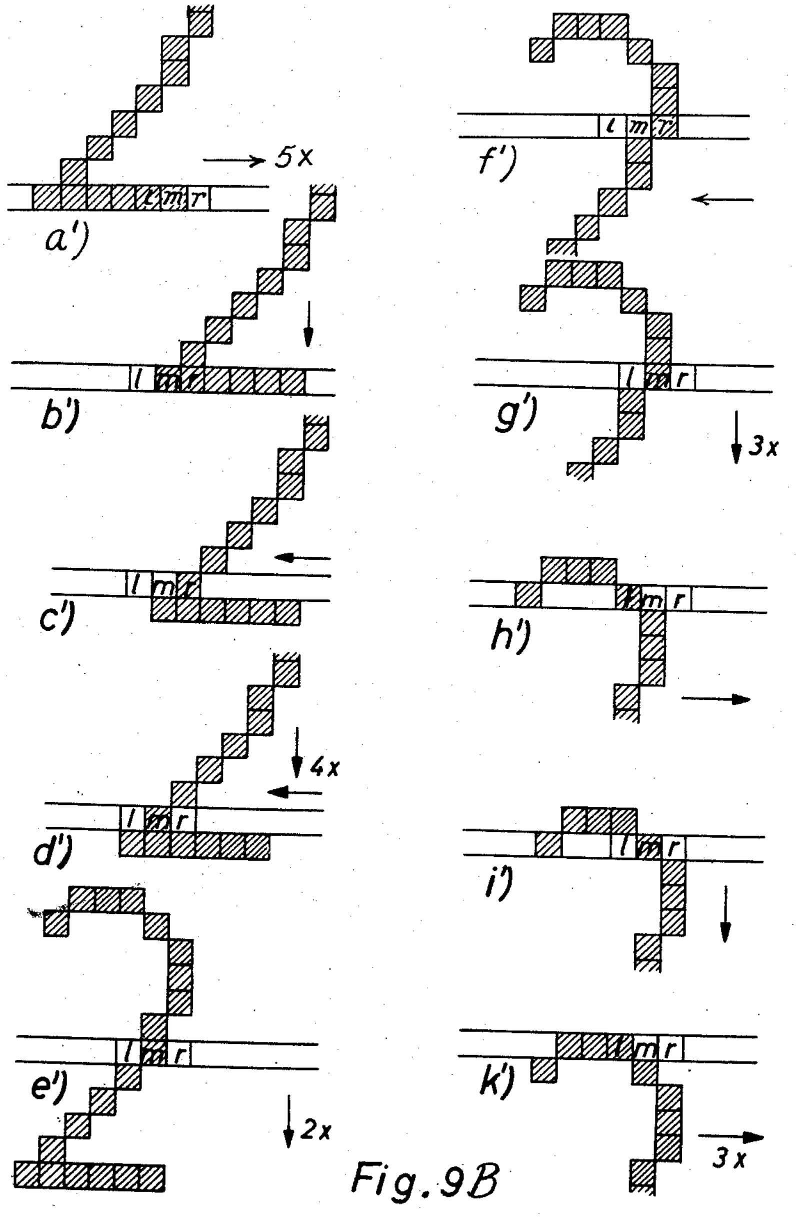
Figure 10:
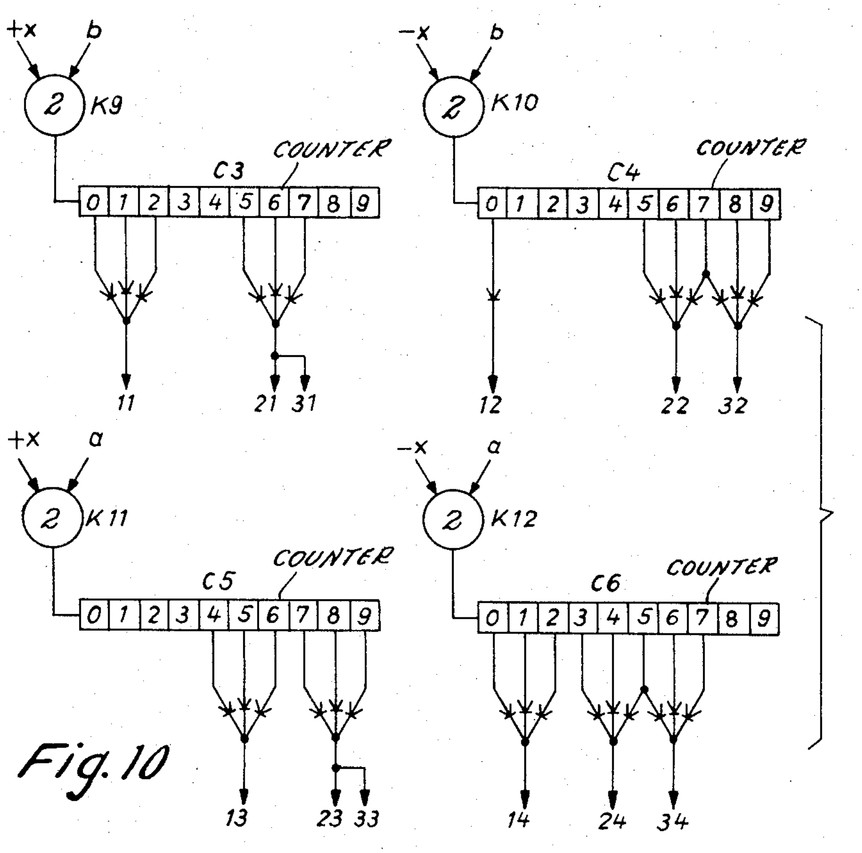
Figure 11:
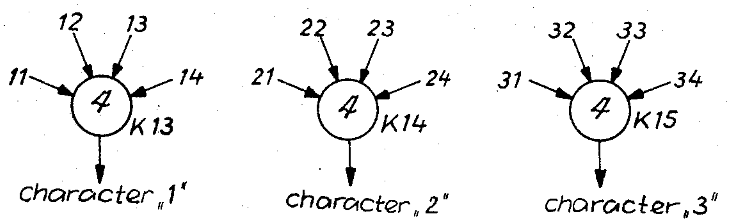

FIG. 3 shows the circuit arrangement of one storage cell within the two-dimensional register, FIG. 3A is a simplified drawing of the shift register stage shown in FIG. 3, FIG. 3B is a simplified drawing illustrating the incorporation of the circuitry of FIG. 3A into the system of FIG. 2, FIG. 4 shows part of a coincidence arrangement for the character evaluation of the two-dimensional shift register, FIG. 5 shows the spiral-shaped movement of one point of the character within the shift register, FIG. 6 schematically shows an arrangement for carrying out the spiral-shaped displacement of the characters, FIG. 7 schematically shows a two-dimensional shift register for the evaluation of the characters according to their contours, FIG. 8 shows a coincidence arrangement for controlling the steps of displacement, FIGS. 9, 9A, 9B, and 9C show all of the steps of displacement for contour evaluation with respect to the numeral 2, FIG. 10 shows an arrangement for controlling the different steps of displacement, FIG. 11 shows a coincidence arrangement for assigning the steps of displacement to the FIGURES 1, 2, and 3, and FIG. 12 shows a schematic diagram of the complete arrangement of FIGS. 1 to 6.

Figure 12:
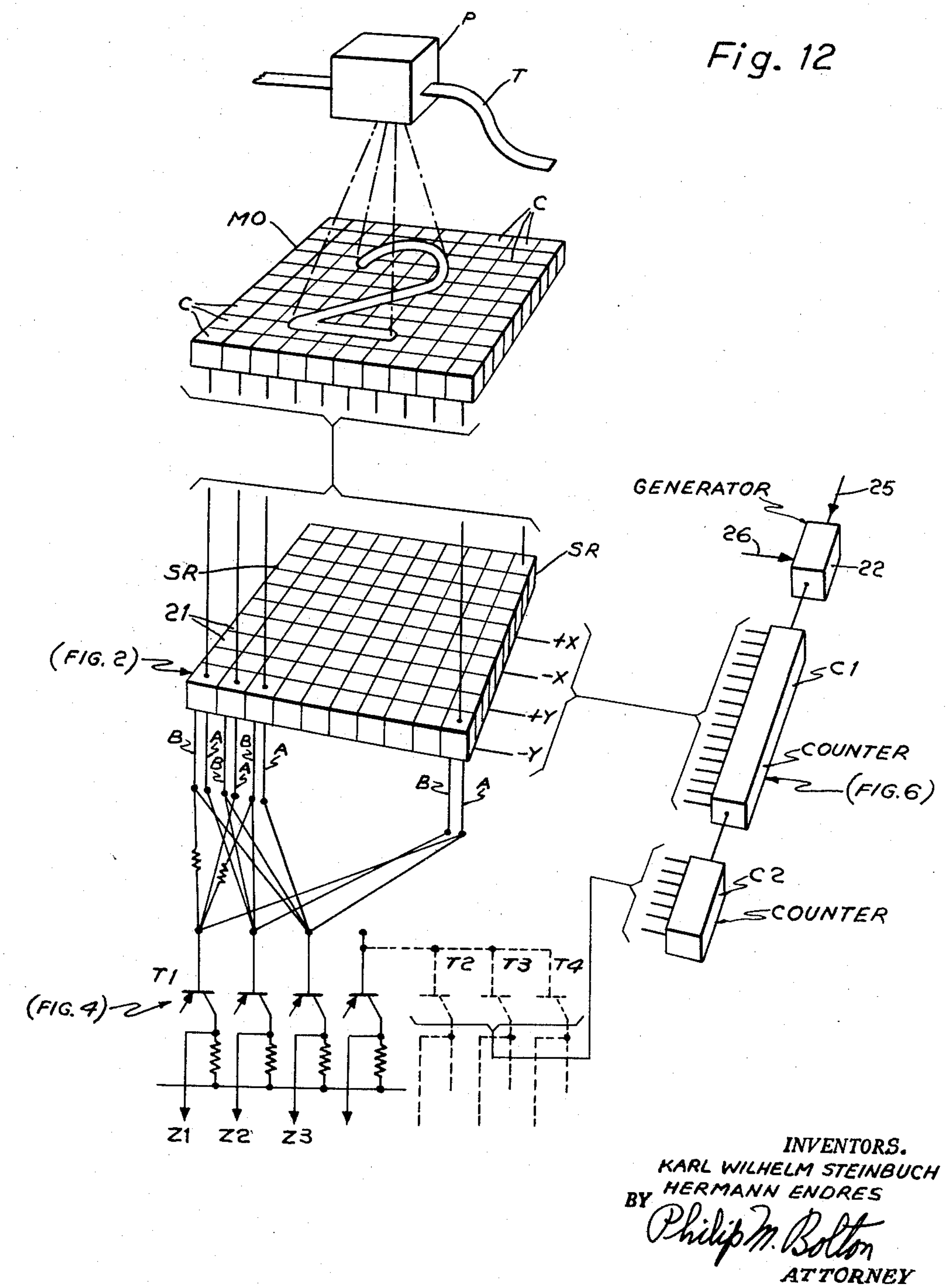

A convenient way of presenting a character for analysis is to project an image of it upon a mosaic of light-sensitive cells. Such an arrangement is shown in FIG. 12, where a tape T containing printed characters is fed through a projector P which optically projects the characters successively upon the mosaic MO of light-sensitive cells C, each occupying one raster area or element *bxy*. Each of the cells C corresponds to one of the storage cells 21 in the shift register SR.

The numeral Z is shown in FIGS. 1 and 12 projected upon the raster field of the mosaic MO. The raster areas or elements which are either completely or partly covered by the character are then stored at the corresponding points of the shift register SR as one storage condition and the remaining raster elements are stored as the other one of the two storage conditions. Thus the voltage $U_0$ may be assigned the hatchlined elements, while the voltage O may be assigned to the free elements.

In FIG. 2 a block diagram of a two-dimensional shift register is shown. This may be the shift register SR of FIG. 12. The informations or the data stored in the register SR may be shifted or displaced, according to the invention, in all four directions. To this end, the four shift leds $+x$, $-x$ and $+y$, $-y$ are provided. The + or — signs are supposed to indicate that the shift directions are of opposite nature. The four connecting leads between each two adjacent storage cells serve in pairs to produce the displacement in two directions. The reference numerals shown in the rectangles 21 representing the storage cells respectively indicate the parts cooperating between two storage cells.

The shift register may either consist of flip-flop stages, ring-cores having a rectangular hysteresis loop, or of any other bistable elements or arrangements.

In FIG. 3 a storage cell is shown constructed from a flip-flop arrangement and this may be the preferred form. The circuit arrangement of a flip-flop stage for the use in a shift register is well known according to the prior art and does not need to be described in particular herein. It should be mentioned, however, that due to the displacement in four directions four displacing or shift leads are required, as well as the corresponding coupling elements between each two storage cells. The reference numerals 1–20 are identical with the numerals shown in the rectangles 21, so that the cooperation between two storage cells will be understood without further ado. The condition being set up upon reading-in in the individual cells, is read out at the two output points A and B, i.e. at the point A there is taken off the complementary condition of the point B. Both of these conditions are necessary for the evaluation, because in the connected coincidence arrangement the respective black and white conditions are required, in order to have an equal number of coincidence leads for each coincidence point.

In FIG. 3A it is assumed that the transistors marked with a dot are conductive, i.e. that for flip-flop 1 at the point B the potential 0, and at the point A the potential —13 v., exists. For the flip-flop 2 the point B has the potential —13 v., and the point A the potential zero. The potential —13 v., therefore, is applied to the diode leading to the base of the left-hand transistor of flip-flop FF2. This diode, however, is polarized so that it does not allow this potential to pass to the base. If now a clock-pulse of +13 v. is delivered to the line T (the shift input) the flip-flop 2 is tilted the other way because a positive potential is now applied to the base of the right-hand transistor. The potential +13 v. cannot reach the base of the left-hand transistor due to the negative bias on the diode. Thus, the pulse remains without effect there, even in the case where left-hand transistor has been conductive.

The circuits of FIG. 3B serve to explain the shifting in the +X and —X directions (right and left). The mode of operation of the up or down shift is the same as the right or left, and to simplify the figure, the up and down shifting lines have been omitted. Again, as in FIG. 3A, the transistor marked with a dot is conductive. For shifting in the —X direction a pulse of +13 v. is applied via the $-x$ line and the coupling 11 to the bases of all transistors shown in the figure. Here again, the pulse can become effective only at that base at which the biasing of the diode is smaller than —13 v. Since the feedback of potentials is accomplished from the right to the left stage, the shifting is prepared from the right to the left. For shifting up and down, as mentioned above, the same procedure will apply and the points, 3, 4, 14 and 15 serve this purpose.

In FIG. 4 of the drawings part of a coincidence arrangement is shown which may serve the purpose of identifying the characters. The arrangement is also indicated in FIG. 12. The flip-flop stages of the two-dimensional shift register are also in this case schematically represented by the rectangles 21. The outputs A and B of the individual stages are connected in accordance with the character to be identified across resistors R with the gate circuits T1. These gates are opened when all of the outputs, connected with the respective gate, are properly marked. Transistors are used as gates, the emitter voltage being chosen so that the transistors are only connected through in the presence of the corresponding coincidences, because the coincidence points are connected with the respective base electrodes. The collector line serves as the output for indicating the identified character.

In FIG. 4 the common emitter voltage $U_1$ is indicated as being variable in a step-by-step manner. Accordingly, it is possible due to the different threshold voltage $U_1$ to determine at how many coincidences the transistors are connected through. Since, on the other hand, the coincidences are determined by the ideal character it is thus possible to determine at what degree of accuracy the read character has to agree with the ideal character in order to obtain a statement at the outputs Z.

The reliability of properly identifying a character is the greater the closer the threshold voltage comes to the voltage characterizing the ideal character. For this reason the read character on the plane-shaped storage device will have to be placed as exactly as possible on the connected coincidence arrangement. However, since this will not always be the case, the problem will arise of properly positioning of the character within the plane-shaped storage device. This may be accomplished in a very simple manner with the aid of the plane-shaped storage device, because this device permits a displacement in four different directions.

The displacement is effected most appropriately in a spiral-shaped manner, as will be seen from FIG. 5 of the drawings. FIG. 6 shows a block diagram of a circuit arangement capable of controlling this spiral-shaped movement of the characters within the plane-shaped storage device. The pulse generator 22, which is started subsequently to the storing of the character, is adadpted to control a counting device $C_1$ consisting of the parts D for the one direction of passage, and E for the opposite direction of passage of the spiral. The shift leads of the register are connected to the outputs of the counting device $C_1$ in the manner shown in the drawing. The outputs of the counting device as well as the number of its stages depend on the shape of the spiral.

From the showing of FIG. 5 it will be seen that first of all a shifting or displacing step in the $+x$ direction will have to be carried out thereafter a step towards $+y$, two steps towards $-x$ and $-y$, and finally two steps towards $+x$. With respect to the opposite passage of the spiral, the outputs of the counting device are correspondingly designated in the portion E of the counter $C_1$. In case it is desired to pass the spiral through several times forwardly and backwardly, the counting device $C_1$ will be designed as a ring counter. The spiral is at first passed through from the inside towards the outside, and at each shifting step the counting device is stepped on by one position. As will be seen from FIG. 6 of the drawings, a first step is carried out in the direction $+x$. This causes the counting device to proceed into the second position, the output of which is connected with the stepping line $+y$, in other words, the character is now being stepped on by one step in the direction $+y$. In the third and fourth position of the counting device the counter will give the order of displacing the character twice in the direction $-x$, etc. until the counting device will assume the ninth position. In this position the spiral will have been passed through completely in the one direction. This stage, therefore, is connected with no shift lead. Thereupon the spiral, controlled by the tenth through seventeenth position of the counting device, will be passed through in the opposite direction. In the eighteenth position the starting point of the spiral will then be reassumed, and the displacement may be started afresh, provided that this is desired and the counting device is designed as a ring counter.

The two stages V and R of the counting device are respectively connected via a diode with the input of a second counting device $C_2$. The outputs of this counting device are connected with the voltage source $U_1$ for the gating circuits $T_1$. If the counting device $C_2$ is in its first position, then the threshold voltage $U_{11}$ will be applied with the strongest requirement of coincidence to the transistors $T_1$. As soon as the counting device $C_1$ has assumed the position V, a stepping pulse will be applied to the counting device $C_2$, which is thus caused to proceed into its second position. The output of this stage will effect a switching to the next lower threshold voltage $U_12$, requiring a less severe requirement of coincidence, so that in the case of a passage of the spiral in the opposite direction this last mentioned requirement of coincidence will be decisive. In other words, the counter, C2, is the means for varying the common emitter voltage $U_1$ in a step-by-step manner, as mentioned above (when the counter is at stage 1 the result is $U_11$, at stage 2 $U_12$, etc.). The counter may be used in conjunction with switching circuits to effectively produce this result, or on the other hand, the counter itself may act as a connecting through for different voltage levels. Any conventional means will suffice. When the counting device approaches the position R, then again a stepping pulse will be applied to the counting device $C_2$, which is thus caused to proceed into the third position and to switch on the next lower threshold voltage. The spiral will be passed through forwardly and backwardly with successively new threshold voltages until an identification of the character is provided. Thereupon the generator will be automatically switched off and both the counting devices $C_1$ and $C_2$ will be returned to normal (position 0).

In many cases it may be desirable, for reasons of saving time, to let the spiral of FIG. 5 be passed through once only, and yet to carry out all requirements of coincidence. To this end several transistors $T_{2 \ldots n}$ are connected on the base electrode side in parallel with each coincidence transistor $T_1$, and the threshold voltage values corresponding to the different requirements of coincidence are respectively impressed on the emitters. With respect to a transistor $T_1$, the parallel transistors $T_{2 \ldots 4}$ serving the above mentioned purposes, are indicated by the dash lines in FIG. 4. In the latter case the statements of the various outputs of the parallel transistors will be stored, so that after the passage of one complete spiral the best suitable coincidence may be read from these storage devices. For the passage of the spiral, the counting device $C_1$ of FIG. 6 is again provided, but only up to the position V. The remaining part of the counting device, as well as the counting device $C_2$, may be dispensed with in this case.

With reference to the following figures of the drawings, a second method for the identification of characters employing a two-dimensional shift register will not be described. The basic idea of this method consists in tracing or determining the contours of the characters within the storage device and to assign them to the characters. This is rendered possible when providing certain storage cells, and when displacing the character step-by-step in such a manner that all points of the character will touch these cells once or several times; because in this way the contours may be determined, by means of the effected order of succession as well as by the number of shifting steps in the four directions, in a corresponding coincidence arrangement.

The character to be identified, similar to that in the first example, is subjected to a photo-electrical scanning operation, as in FIG. 12, and is stored in a two-dimensional shift register consisting e.g. of flip-flop stages according to FIG. 3. However, the shift register employed in this case is double the size that would be necessary in view of the size of the characters. Accordingly, it may be divided into a lower and an upper storage device. Furthermore, between both parts there is arranged an additional row of storage cells serving the constitution of the criterions regarding the contours of the character. This middle row of storage cells is divided into the storage F*m* (center) as well as into several storages F*l* (left) and F*r* (right). In FIG. 7 the information lines extending between the individual storage cells have been omitted for reasons of clarity, and only the four shift leads are shown. The particularly marked rows of storage devices (F*o*) and (F*u*) may be used for the more distinct seizure of the character contours, as will still be described hereinafter.

The scanned character will be stored in the lower part of the shift register and will then be shifted into the upper part, i.e. in such a way that the right-hand contour of the character will pass through the cell F*m*. The circuit arrangement for the shifting of the characters is, therefore, made in such a way, that as long as the middle row of storage cells is not being touched by the character, the character will be shifted in the direction $+y$, provided that the pulse generator 23 (FIG. 8) initiates the corresponding shifting steps. The pulse generator 23 is energized via the line 25 and is deenergized upon termination of the shifting steps via the line 26. When the upper edge of the character approachegs the middle row of storage cells, a bistable arrangement 24 will be rendered operative, which bistable arrangement is adapted to record the up and down movement of the character. The bistable relaxation arrangement is provided with two outputs *a* and *b*. Upon arrival of a first pulse from the middle row of storage cells, it will proceed into the condition *b*, where it will remain until the next pulse of the middle row arrives. If now the second pulse of the middle row arrives after it has been completely free from character portions, the arrangement 24 will be shifted into the position *a*, that is, into its initial position. Due to the fact that the characters are at first stored in the lower portion of the plane-shaped storage device, and are then shifted into the upper portion, and finally shifted back again downwardly, this will mean that in the position *b*, the shifting steps will be in the direction *x* during the upward movement, and in the position *a*, the shifting steps will be in the direction *x* in the course of the downward movement.

The controlling of the shifting steps is effected with the aid of the coincidence gates $K_1 \ldots K_8$, which, in the presence of the aforementioned input pulses, will release the shifting steps indicated at the outputs. As long as the middle row or line (F*l*), (F*m*), and (F*r*) is not being touched, the generator 23 will effect the stepping on of the character via the gate $K_1$ in the direction $+y$. If the character touches the middle row then at first the flip-flop arrangement 24 will be switched to position *b*, and the character will be shifted towards the left $(-y)$, the right $(+x)$ or above $(+y)$ via the gates $K_2$, $K_3$ or $K_4$. The shifting towards the left $(-x)$ via $K_2$ is effected when F*r* either alone, or F*r*, and F*m* or F*r* and F*m* and F*l* are being touched by the character. A shifting towards the right $(+x)$ is only possible as long as one or more cells F*l* have responded alone. The shifting in the upward direction $(+y)$ is always effected when F*m*, but not F*r* have responded. In this way the character according to FIG. 7 is brought via F*m* into the upper half of the register until finally the middle line is no longer being touched. Thereupon via $K_5$ the character will be displaced or shifted in the direction $-y$, because the middle line is being touched again, and 24 will be shifted into the position *a*. Thereupon the opposite process will be carried out, the left-hand edge of the character will be shifted by F*m*, i.e. via the coincidence gate circuits $K_6$, $K_7$ and $K_8$ until the whole character is again in front of the lower half of the storage device. The $+x$ as well as the $-x$ pulses are counted separately for the shifting towards above and below.

From FIG. 8 the above mentioned conditicns for the shifting steps will be easily readable. Since, besides the output signals of the middle row of storage cells, the complementaries thereof are also used for the controlling of the gates $K_1 \ldots K_8$ by means of the complementary imaging devices 27 at the outputs of the storage devices.

Under these conditions the character, for example the FIGURE 2, will be shifted within the two-dimensional shift register in the manner indicated in FIGS. 9, 9A, 9B, and 9C. The arrows between the individual shift stages are supposed to indicate in what direction the shifting between the respective stages is taking place. Accordingly, the character will be shifted at first from the lower part of the shift register into the upper part, in the course of which the right-hand edge of the character is determined. After the character has been completely shifted into the upper half, that is, when it no longer touches the middle row, then the direction of shift will be reverted from $+y$ to $-y$. As soon as the character touches the middle row again the bistable arrangement will reassume its position *a*, thus indicating the shiftings appearing in the course of the downward movement in the direction *x*. In the course of this downward movement of the character the left-hand edge will be shifted by F*m* and determined in this way. The necessary shifting steps may likewise be taken from FIGS. 9, 9A, 9B, and 9C of the drawings.

The shifting steps in the direction *x* appearing in the course of the upward and the downward movement of the characters are counted by the counting devices shown in FIG. 10 of the drawings. Four counting devices $C_3$–$C_6$ are provided, namely, two for the upward movement ($C_3$, $C_4$), and two for the downward movement ($C_5$ and $C_6$). The counting devices $C_3$ and $C_5$ are adapted to count the shifting movements in the direction $+x$, and the counting devices $C_4$ and $C_6$ are provided for counting the shifting movements in the direction $-x$. The reading-in of the counting pulses is effected via the coincidence gates $K_9$–$K_{12}$, each having two inputs, i.e. one for the shifting step pulse and one for indicating the upward (*b*) or downward (*a*) movement. The outputs of the counting devices are connected with coincidence gates serving the indication of the identified character. In view of the fact that the number of pulses, that is, of the shifting steps is not exactly the same in the case of different shapes of characters, several outputs of the counting devices are partly connected by means of OR-gates and are only thereafter assembled in the coincidence arrangement for the corresponding character. The FIGURE 1, for instance, may lie exactly perpendicularly or slightly inclined within the scanning field. From this approximately 0, 1 or 2 $+x$ pulses will result for the upward movement. The coincidence arrangement for the FIGURE 1 is therefore connected with the first three outputs of the counting device $C_3$. The coincidence requirements for the FIGURES 1, 2, and 3 are laid down in FIG. 11. This drawing shows the three coincidence gates $K_{13} \ldots K_{15}$. The respective inputs are connected with the counting stages which are adapted to indicate the necessary number of shifting steps for the corresponding figure. The reference numerals at the outputs of the counting devices and at the inputs of the coincidence gates indicate the mutual assignment. In the described example the $+x$, as well as the $-x$, pulses for the whole character are divided into two areas only, namely, the right-hand side of the character during the movement towards above and the left-hand side of the character during the movement towards below. In the case of strong deviations of the characters to be identified from the character assumed as ideal it is appropriate to select a more refined division. A division into four parts or areas may be acomplished e.g. by doubling the number of the counting devices of FIG. 10, in which case the input coincidences for these counting devices are no longer controlled by the two positions *a* and *b* of the bistable relaxation arrangement 24, but by a suitable distributor, which is connected to the generator 23 as shown in FIG. 8 of the drawings.

It is also possible to control the input coincidence arrangement for the counting devices from a line of storages lying in the middle of one half of the storage device, i.e. by the lines F*u* or F*o*, in order to obtain in this way two separate areas for the upward movement and for the downward movement of the character, hence a total of four partial areas for the whole edge of the character.

The present invention has been described in the foregoing with reference to orthogonal two-dimensional shift register. In some cases however, it may also be useful to arrange the storage cells at the corners of triangles or general polygonals or employ multi-dimensional shift registers.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. Apparatus for the automatic identification of characters comprising a plurality of identical cell units arranged in a coordinate array each capable of assuming one of two storage conditions, coupling means between each cell and its neighbor in both coordinate directions, means for simulating a character in said array by the conditions of said cells, means including said coupling means for shifting the character in any coordinate direction, and evaluating means selectively coupled to said cells for effecting a determination of the data therein.

2. Apparatus as claimed in claim 1, in which the evaluating means comprises coincidence gate means connecting all of those outputs of the storage cells together which will have stored a predetermined value for a particular character, means for biasing the gates for providing an output only when the input signal exceeds a predetermined threshold and means for altering the bias whereby the degree of completeness of coincidence is varied.

3. Apparatus as claimed in claim 2 in which the shift means comprises means for shifting the character in a regular path in the two coordinate directions until an optimum coincidence results.

4. Apparatus, as defined in claim 3, in which the shifting means shifts the stored data in a spiral path.

5. Apparatus, as defined in claim 3, in which the shifting means shifts the stored data a plurality of times over the same path.

6. Apparatus, as defined in claim 3, in which the shifting means shifts the stored data in a meander-shaped path.

7. Apparatus, as defined in claim 2, further comprising means for checking the degree of completeness of the coincidence of signals from the storage cells with different requirements of the degree of completeness of coincidence.

8. Apparatus, as defined in claim 5, further comprising means for checking the degree of completeness of the coincidence of signals from the storage cells with a different requirement for the degree of coincidence completeness for each traverse of the stored data over the same path.

9. Apparatus, as defined in claim 8, in which the shifting means comprises a first counting device having two parts, a pulse generator connected to said counting device for causing it to count, means connected between one part of said first counting device and the shift register for shifting the data therein one step along a coordinate for each step of said counter to form a predetermined path, means connected between the other part of said first counting device and said shift register for shifting the data stored therein one step along a coordinate for each step of said counter to form a path which is the reverse of said predetermined path, each part of said counting device comprising as many stages as is necessary to shift the data along the predetermined path, a second counting device, means at the last stage of each part of said first counting device connected to said second counting device for advancing said second counting device one step when both parts of said first counting device have completed one cycle, and means connected to said second counting device and to the coincidence means for adjusting the threshold-controlling bias of the coincidence means step-by-step with each step of said second counting device.

10. Apparatus, as defined in claim 3, further comprising means for checking the coincidence of signals from the storage elements in each position of the shift path for a plurality of different biases determined by the bias adjusting means, means for comparing the accuracy of the coincidence of signals at each adjustment of the bias adjusting means with that of the coincidence of signals produced by the ideal character, means for storing the information thus obtained, and means for thereupon determining the most accurate coincidence.

11. Apparatus, as defined in claim 10, in which the coincidence means comprises a plurality of gates connected in parallel, each having a different coincidence requirement.

12. Apparatus, as defined in claim 11, in which the gates are transistors having their base electrodes connected in parallel, and means for applying different potential values to the respective emitter electrodes.

13. Apparatus, as defined in claim 1, further comprising a preferred group of storage cells, the shifting of the stored data causing contours of the characters to pass through the cells of said group.

14. Apparatus, as defined in claim 13, in which the cell array is double the size in one direction than that actually corresponding to the characters in the same direction and the center row of storage cells contains those of the preferred group.

15. Apparatus, as defined in claim 14, in which the simulating means feeds data into the lower portion of the cell array, and in which the evaluating means includes means for first evaluating the right-hand edge of the stored character and then the left-hand edge and means for shifting the data in such a way that the character moves into the upper portion and thereafter into the lower portion thereof and the upward movement will move the right-hand edge through the middle storage cell of the middle row of cells and downward movement will move the left-hand edge through said middle storage cell.

16. Apparatus, as defined in claim 15, in which the means for shifting the stored data in the cell array comprises coincidence means having inputs connected to the outputs of the storage cells of either the middle row of storage cells or the complementaries thereof in such a manner that a shift signal will appear at the output of said coincidence means, and means for causing said shift signal to operate the shifting means to carry out the next successive shifting step.

17. Apparatus, as defined in claim 16, in which the shifting means comprises means for separately counting the shifting steps for the right-hand and left-hand edge, and means operated by said counting means for controlling the coincidence means for each character.

18. Apparatus, as defined in claim 17, in which the means for separately counting the shifting steps comprises a bistable element, means for causing said element to assume one of its stable positions at the upward movement of the data in the shift register and the other of its stable positions at the downward movement of the data in said register.

19. Apparatus, as defined in claim 15, in which the left-hand and right-hand edges of the character are divided into a plurality of portions, and in which the evaluating means includes means for shifting the data for each portion of the left-hand and right-hand edges.

References Cited in the file of this patent

UNITED STATES PATENTS

| | | |
|---|---|---|
| 2,615,992 | Flory | Oct. 28, 1952 |
| 2,616,983 | Zworykin | Nov. 4, 1952 |
| 2,918,653 | Relis | Dec. 22, 1959 |
| 2,932,006 | Glauberman | Apr. 5, 1960 |